United States Patent
Otoguro et al.

(10) Patent No.: US 11,279,219 B2
(45) Date of Patent: Mar. 22, 2022

(54) BATTERY FRAME

(71) Applicant: Toyota Jidosha Kabushiki Kaisha, Toyota (JP)

(72) Inventors: Kazuma Otoguro, Toyota (JP); Akira Nishino, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 16/942,890

(22) Filed: Jul. 30, 2020

(65) Prior Publication Data

US 2021/0061080 A1    Mar. 4, 2021

(30) Foreign Application Priority Data

Sep. 2, 2019    (JP) .............................. JP2019-159363

(51) Int. Cl.

| | |
|---|---|
| *B60K 1/04* | (2019.01) |
| *B62D 21/03* | (2006.01) |
| *B62D 25/20* | (2006.01) |
| *H01M 50/20* | (2021.01) |

(52) U.S. Cl.
CPC ................ *B60K 1/04* (2013.01); *B62D 21/03* (2013.01); *B62D 25/20* (2013.01); *H01M 50/20* (2021.01); *B60K 2001/0438* (2013.01); *H01M 2220/20* (2013.01)

(58) Field of Classification Search
CPC .......... B62D 21/03; B62D 25/20; B60K 1/04; H01M 50/20
See application file for complete search history.

(56) References Cited

U.S. PATENT DOCUMENTS

| | | | |
|---|---|---|---|
| 8,464,817 B2 * | 6/2013 | Usami ...................... | B60K 1/04 180/68.5 |
| 8,585,132 B2 * | 11/2013 | Klimek ................ | B60K 15/067 296/193.07 |
| 9,242,540 B2 * | 1/2016 | Shiraoka .................. | B60K 1/04 |
| 2005/0260488 A1 * | 11/2005 | Zhou ...................... | B60R 16/04 429/99 |
| 2014/0014428 A1 | 1/2014 | Yanagi | |
| 2014/0231162 A1 * | 8/2014 | Shiraoka .................. | B60K 1/04 180/68.5 |
| 2015/0174996 A1 | 6/2015 | Ikeda et al. | |
| 2020/0062318 A1 | 2/2020 | Otoguro et al. | |

FOREIGN PATENT DOCUMENTS

| | | |
|---|---|---|
| JP | 2014-019203 A | 2/2014 |
| JP | 2015-123797 A | 7/2015 |
| JP | 2020-032738 A | 3/2020 |

* cited by examiner

*Primary Examiner* — Jonathan Ng
*Assistant Examiner* — James J Triggs
(74) *Attorney, Agent, or Firm* — Dinsmore & Shohl LLP

(57) ABSTRACT

A battery frame that supports a bottom of a battery pack mounted under a floor panel includes a plurality of first cross members extending along the vehicle width and having opposite ends coupled to the floor side members to thereby support the bottom of the battery pack, a second rear cross member coupled with a rear cross member and extending along the vehicle width to support the bottom of the battery pack, and first side members and second side members extending along the vehicle length and coupled with the first cross members and the second rear cross member. The first side members and the second side members are disposed such that their edge lines are connected along the vehicle length.

4 Claims, 5 Drawing Sheets

BATTERY FRAME

CROSS REFERENCE TO RELATED APPLICATION

This application claims priority to Japanese Patent Application No. 2019-159363 filed on Sep. 2, 2019, which is incorporated herein by reference in its entirety including the specification, claims, drawings, and abstract.

TECHNICAL FIELD

The present disclosure relates to a structure of a battery frame that supports, from underneath, the bottom of a battery pack mounted under a floor panel of a vehicle.

BACKGROUND

In recent years, a motor vehicle typically includes a battery pack mounted under the floor of the vehicle. JP 2014-19203 A discloses the structure of a battery pack that includes a casing housing battery modules therein, cross members extending along the width of the vehicle within the casing, and brackets protruding outward in the vehicle width direction from the outer surface of the casing at locations where the cross members are arranged. The brackets are coupled to the undersurface of the vehicle body to mount the battery pack under the floor of the vehicle.

SUMMARY

The structure of the battery pack described in JP 2014-19203 A, however, may cause significant deformation of the battery pack along the vehicle length when a large lengthwise load is input to the vehicle.

One embodiment of the disclosure is therefore directed toward reducing deformation of a battery pack along the length of a vehicle.

In accordance with an aspect of the disclosure, a battery frame is coupled with a pair of side members disposed at widthwise opposite sides of a vehicle and extending in a length direction of the vehicle and with a rear cross member coupling the pair of side members along a width in a rear part of the vehicle, and the battery frame is configured to support, from underneath, a bottom of a battery pack mounted under a floor panel disposed between the side members. The battery frame includes a plurality of first cross members extending in a width direction of the vehicle and coupled to the side members at opposite ends, respectively, to support the bottom of the battery pack; a second cross member coupled with the rear cross member and extending in the width direction of the vehicle to support a rear end of the bottom of the battery pack; and lengthwise members extending in the length direction of the vehicle and coupled with each of the first cross members and the second cross member. In the battery frame, the lengthwise members are elongated members each having a hat-shaped cross section, and the lengthwise members are disposed such that edge lines thereof extend continuously in the length direction of the vehicle.

The edge lines of the lengthwise members that extend continuously in the vehicle length direction as described above may enhance the strength of the lengthwise members, thereby reducing deformation of the battery frame and also reducing deformation of the battery pack supported by the battery frame.

The battery frame may include a first region that supports a front part of the battery pack, and a second region that supports a rear part of the battery pack. The lengthwise members may include a plurality of first lengthwise members disposed in the first region and a plurality of second lengthwise members disposed in the second region. At least one of the first lengthwise members and at least one of the second lengthwise members may be disposed such that the edge lines are connected along the length of the vehicle.

The battery frame may have different structures between the front part and the rear part of the vehicle, and this may require the lengthwise members to be disposed independently for each of the regions. Even in such a case, the strength of the lengthwise members against the lengthwise load can be enhanced by connecting the edge lines of the first lengthwise members in the front part of the vehicle and the edge lines of the second lengthwise members in the rear part of the vehicle along the length of the vehicle.

In the battery frame, the first lengthwise members may include a pair of first side members disposed at widthwise opposite sides of the vehicle and a first center member disposed in a widthwise center, and the second lengthwise members may include a pair of second side members disposed at widthwise opposite sides of the vehicle and a second center member disposed in a widthwise center. Each of the first side members and each of the second side members may be disposed such that the edge lines are connected along the length of the vehicle, and the first center member and the second center member may be disposed such that the edge lines are connected along the length of the vehicle. Further, the second cross member may couple rear ends of the second side members, and a rear end of the second center member may be coupled to a center of the second cross member.

The strength against the lengthwise load can be further enhanced by connecting the edge lines of a plurality of lengthwise members along the length of the vehicle.

The present disclosure can reduce deformation of the battery pack in the length direction of the vehicle.

BRIEF DESCRIPTION OF DRAWINGS

Embodiments of the present disclosure will be described based on the following figures, wherein.

DESCRIPTION OF EMBODIMENTS

An embodiment of a battery frame 100 according to an embodiment will be described below by reference to the drawings. In each figure, an arrow FR, an arrow UP, and an arrow RH indicate the forward direction (traveling direction), the upward direction, and the rightward direction of a vehicle, respectively. Directions opposite to these arrows FR, UP, and RH indicate the rearward direction, the downward direction, and the leftward direction of the vehicle, respectively. In the following description, unless otherwise specified, forward and rearward, leftward and rightward, and upward and downward refer to forward and rearward along the length of a vehicle, leftward and rightward along the width of the vehicle, and upward and downward along the height of the vehicle, respectively.

Figure 1:
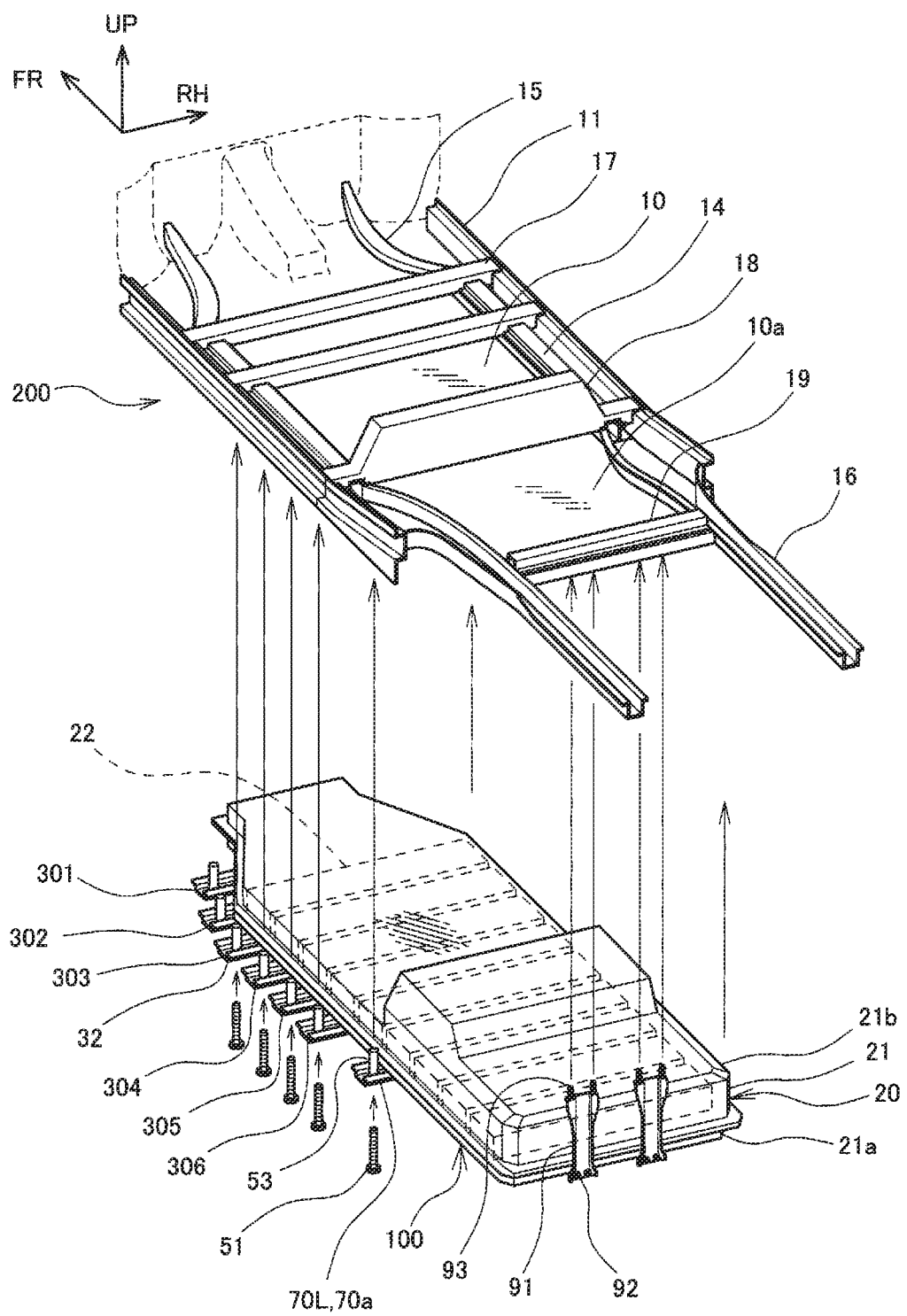
FIG. 1 is an exploded perspective view illustrating a battery pack mounted under a floor panel of a vehicle using a battery frame according to an embodiment.

As illustrated in FIG. 1, a battery frame 100 is a structural member that is coupled to the underside of a vehicle lower structure 200 with bolts 51 and bars 91 to support, from underneath, the bottom of a lower casing 21a of a battery pack 20.

The vehicle lower structure 200 to which the battery frame 100 is to be coupled will first be described. As illustrated in FIG. 1, the vehicle lower structure 200 includes a floor panel 10, a rear floor panel 10a, rocker panels 11, floor side members 14, front side members 15, rear side members 16, a front cross member 17, a floor cross member 18, and a rear cross member 19. The floor side members 14, the front side members 15, and the rear side members 16 constitute side members.

Figure 2:
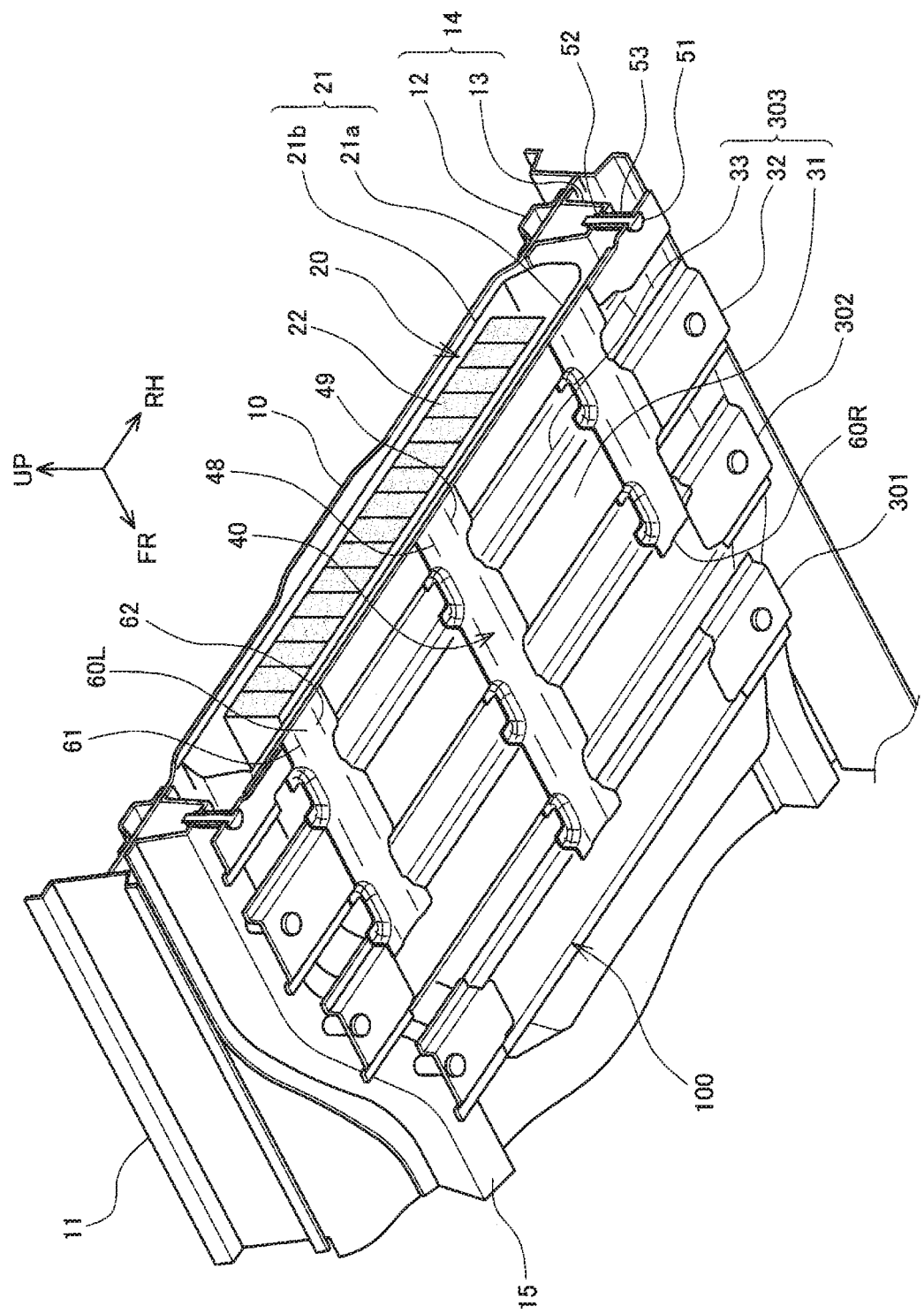
FIG. 2 is a perspective view illustrating the battery pack mounted under the floor panel of a vehicle using the battery frame according to the embodiment, as viewed from the underside.

The floor side members 14 are frame members disposed at both right and left sides in the lower part of the vehicle and extending in the length direction of the vehicle. As illustrated in FIG. 2, the floor side member 14 includes an upper side member 12 and a lower side member 13 having hat-shaped cross sections, respectively, whose open ends are joined together via the floor panel 10 to form a structure with a closed section.

As illustrated in FIG. 1, the front side member 15 is a frame member that is coupled to a front end of the floor side member 14 and extends forward of the vehicle at each of the right and left sides of the vehicle. The rear side member 16 is a frame member that is coupled to a rear end of the floor side member 14 and extends rearward of the vehicle. The rocker panel 11 is a frame member that is disposed further outward along the vehicle width with respect to the floor side member 14 and extends lengthwise.

The front cross member 17 is a frame member that couple together the right and left rocker panels 11 at locations near the front ends of the floor side members 14. The front cross member 17 is also coupled with the right and left floor side members 14. The floor cross member 18 is a frame member that couples together the right and left rocker panels 11 at locations near the rear ends of the floor side members 14. The floor cross member 18 is also coupled to the floor side members 14. The rear cross member 19 is a frame member that couples together the rear side members 16 along the vehicle width at lengthwise intermediate locations of the rear side members 16.

The floor panel 10 forming a floor of the vehicle is mounted in the region enclosed by the left and right rocker panels 11, the front cross member 17, and the floor cross member 18. Further, the rear floor panel 10a forming the floor in the rear part of the vehicle is mounted in the region enclosed by the right and left rear side members 16, the floor cross member 18, and the rear cross member 19.

As illustrated in FIGS. 1 and 2, the battery pack 20 includes a plurality of battery stacks 22 housed within a casing 21 formed by the lower casing 21a and an upper casing 21b. Each of the battery stacks 22 has a rectangular parallelepiped shape including a plurality of battery cells stacked longitudinally, and is housed within the casing 21 such that the stacking direction corresponds to the vehicle width direction.

Figure 3:
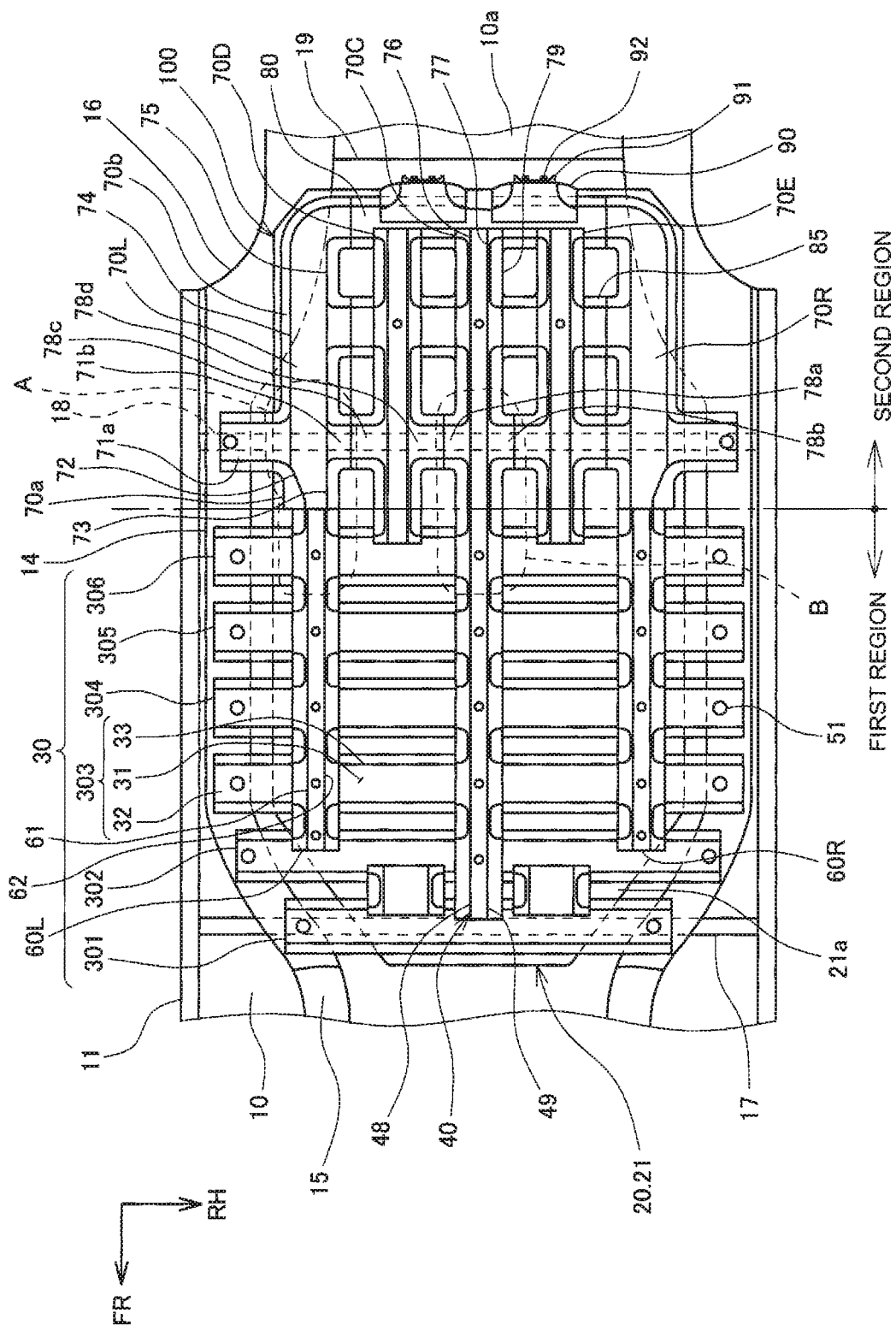
FIG. 3 is a bottom view illustrating a bottom of the battery frame according to the embodiment.

As illustrated in FIG. 3, the battery frame 100 includes a plurality of first cross members 30, a second rear cross member 80, and a second front cross member 85 that extend in the width direction of the vehicle, a pair of first side members 60L and 60R, a first center member 40, a pair of second side members 70L and 70R, a second center member 70C, and a pair of second intermediate members 70D and 70E that extend in the length direction of the vehicle.

The first cross members 30, the first side members 60L and 60R, and the first center member 40 are disposed in a first region of the battery frame 100 that supports the front part of the battery pack 20. The second rear cross member 80, the second front cross member 85, the second side members 70L and 70R, the second center member 70C, and the second intermediate members 70D and 70E are disposed in a second region that supports the rear part of the battery pack 20.

The first cross members 30 disposed in the first region include six first cross members 301 to 306. The first cross member 301 is the first cross member 30 disposed at the front end of the vehicle, and the first cross member 306 is the first cross member 30 disposed in the center part of the vehicle.

The first cross members 301 to 306 are elongated members having a hat-shaped cross section. The first cross members 301 to 306 extend in the width direction of the vehicle and each have opposite end portions 32 and a center portion 31. As illustrated in FIG. 2, the center portion 31 includes a lip portion 33 that is attached to the bottom face of the front part of the lower casing 21a to support the bottom of the front part of the lower casing 21a. The opposite end portions 32 extend outward in the vehicle width direction beyond the lower casing 21a, and are coupled, via collars 53, with the lower side members 13 by the bolts 51. Here, each of the bolts 51 is screwed into a nut 52 welded on the bottom wall of the lower side member 13 to thereby secure the opposite ends 32 to the lower side member 13.

As illustrated in FIG. 3, the right and left first side members 60L and 60R are elongated members each having a hat-shaped cross section with edge lines 61 and 62, and are disposed at widthwise opposite sides to extend in the length direction of the vehicle. Each of the first side members 60L and 60R runs across the first cross members 302 to 306 and is coupled therewith.

Figure 4:
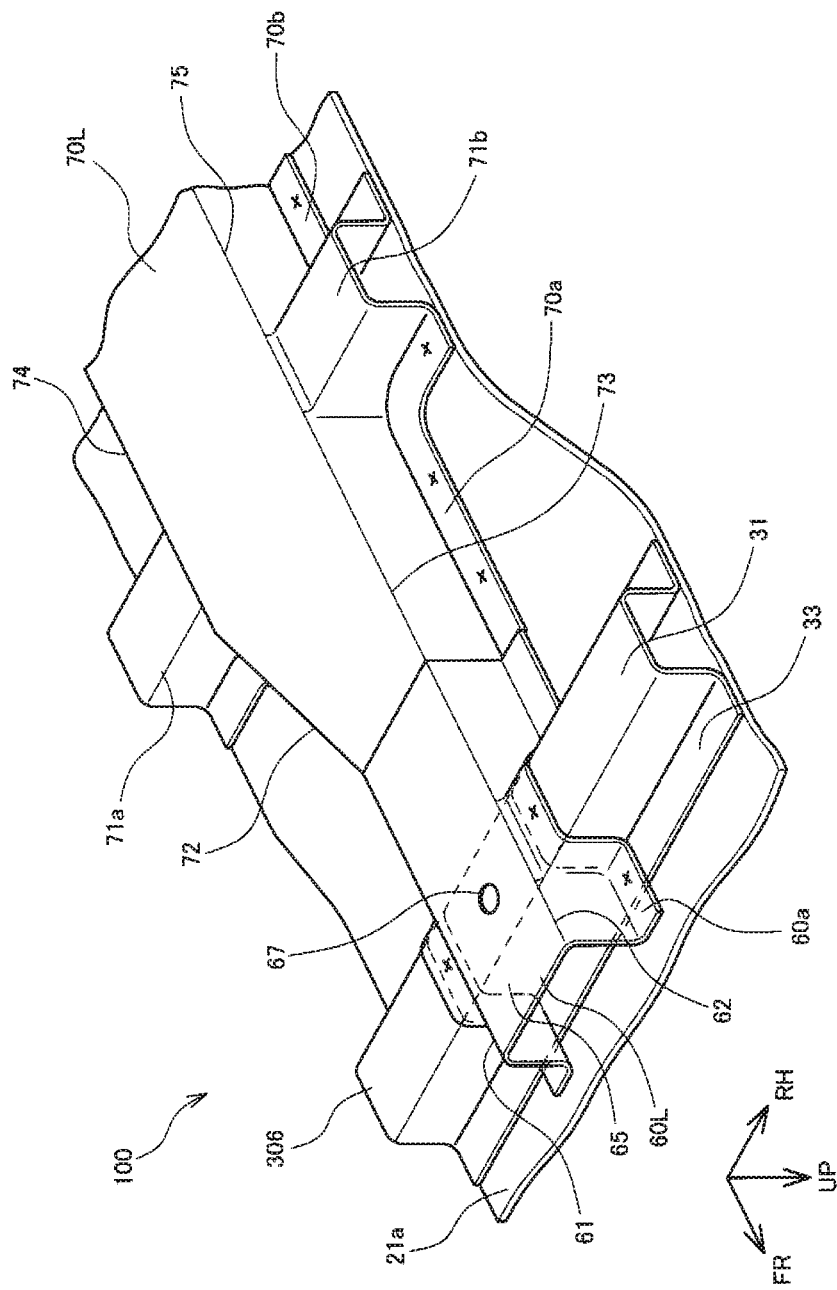
FIG. 4 is a detailed perspective view of a portion A shown in FIG. 3 (a perspective view illustrating an intersecting coupling portion of a first cross member and a first side member and a coupling portion of the first side member and a second side member)

As illustrated in FIG. 4, the first side member 60L on the left side has a height that is greater than the height of the first cross member 306, and the edge lines 61 and 62 extend in the vehicle length direction beyond a region where the edge lines 61 and 62 intersect the first cross member 306. The edge lines 61 and 62 as used herein refer to lines extending longitudinally along the outer face of the respective corners of a groove-shape portion of the member having a hat-shaped cross section, as illustrated in FIG. 4.

The first side member 60L has a U-shape opening at a location where the first side member 60L intersects the first cross member 306, and also includes a lip portion 60a that is bent along the U-shape opening. The lip portion 60a is coupled with the first cross member 306 through spot welding at locations indicated by X in the figure on the surface of the lip portion 33 and the surface of the center portion 31 of the first cross member 306. The first side member 60L further includes a hole 67 in a location on a bottom plate 65 where the first side member 60L intersects the first cross member 306, and the peripheral portion of the hole 67 is secured to the center portion 31 by welding. The configuration of the coupling portion between the first side member 60L and the first cross members 302 to 305 and the configuration of the coupling portion between the first side member 60R on the right side and the first cross members 302 to 306 are the same as the configuration of the coupling portion between the first side member 60L and the first cross member 306 described above.

As illustrated in FIG. 3, the first center member 40 is an elongated member having a hat-shaped cross section with edge lines 48 and 49 and extending in the length direction of the vehicle. The first center member 40 is coupled with the first cross members 301 to 306 such that the first center member 40 runs across the widthwise center parts of the first cross members 301 to 306.

Figure 5:
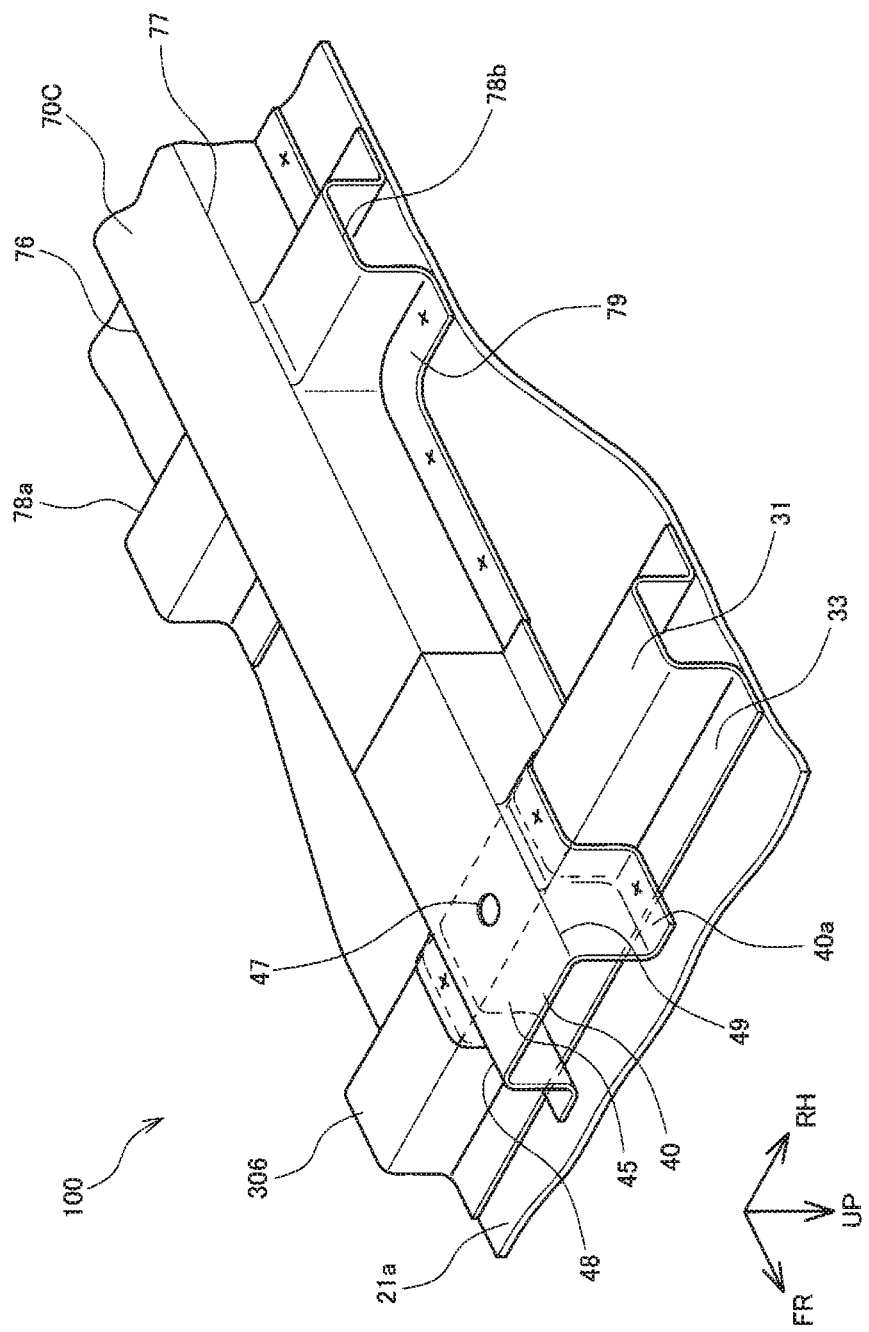
FIG. 5 is a detailed perspective view of a portion B shown in FIG. 3 (a perspective view illustrating an intersecting coupling portion of the first cross member and a first center member and a coupling portion of the first center member and a second center member).

As illustrated in FIG. 5, similar to the first side member 60L described above, the first center member 40 in the center has a height that is greater than the height of the first cross member 306, and the edge lines 48 and 49 extend continuously in the vehicle length direction past a region where the edge lines 48 and 49 intersect the first cross member 306. The first center member 40 has a U-shape opening at the location where the first center member 40 intersects the first cross member 306, and also includes a lip portion 40a that is bent along the U-shape opening. The lip portion 40a is coupled with the first cross member 306 through spot welding at locations indicated by X in the figure on the surface of the lip portion 33 and the surface of the center portion of the first cross member 306. The first center member 40 further includes a hole 47 in a location on a bottom plate 45 thereof where the first center member 40 intersects the first cross member 306, and the peripheral portion of the hole 47 is secured to the center portion 31 by welding.

The first side members 60L and 60R, and the first center member 40, which are described above, form first lengthwise members.

As described above, the first region of the battery frame 100 located in the front part is configured such that the plurality of first cross members 301 to 306 attached to the lower casing 21a extend in the vehicle width direction, with their opposite ends 32 being coupled to the right and left floor side members 14, to thereby support the bottom of the battery pack 20 at multiple points. The first side members 60L and 60R, and the first center member 40 extending in the length direction run across and are coupled with the first cross members 301 to 306, to provide a configuration with rigidity in a planar surface of the entire frame and rigidity along the length of the vehicle.

As illustrated in FIG. 3, the second side member 70L located in the second region is an elongated member disposed on the widthwise left end portion of the vehicle at the rear part of the lower casing 21a and extending in the length direction of the vehicle. The second side member 70L is disposed such that its front end is coupled with the first side member 60L. The second side member 70L includes an outward arm 71a extending outward in the width direction and an inward arm 71b extending toward the widthwise center. The outward arm 71a, similar to the opposite ends 32 of the first cross member 30, protrudes beyond the lower casing 21a in the vehicle width direction and is coupled, via the collar 53, to the lower side member 13, using the bolt 51.

As illustrated in FIG. 4, the second side member 70L has a hat-shaped cross section with edge lines 72 to 75. The center portion of the second side member 70L extending lengthwise has a height that is greater than those of the outward arm 71a and the inward arm 71b, and the front edge lines 72 and 73 extend in the vehicle length direction past the region of the center portion where the outward arm 71a and the inward arm 71b are provided and are connected to the rear edge lines 74 and 75. The second side member 70L includes a front lip portion 70a and a rear lip portion 70b that are secured to the lower casing 21a at locations indicated by X in the figure by spot welding.

The left side of the second side member 70L extends diagonally forward toward the widthwise center from the region of the second side member 70L where the outward arm 71a and the inward arm 71b are provided, such that the width of the second side member 70L is gradually decreased toward the front of the vehicle and the width of the second side member 70L at its front end is the same as the width of the first side member 60L at the rear end. Thus, the edge line 61 on the left side of the first side member 60L is connected to the edge line 72 on the left side of the second side member 70L, and the edge line 62 on the right side of the first side member 60L is connected to the edge line 73 on the right side of the second side member 70L. Because the front edge lines 72 and 73 are connected to the rear edge lines 74 and 75, respectively, as described above, the right and left edge lines 61 and 62 of the first side member 60L are respectively connected to the left edge lines 72 and 74 and the right edge lines 73 and 75 of the second side member 70. The second side member 70R on the right side has a configuration that is symmetrical with respect to the configuration of the second side member 70L.

As illustrated in FIG. 3, the second rear cross member 80 is an elongated member extending along the vehicle width so as to couple the rear ends of the left and right second side members 70L and 70R. The second rear cross member 80 has a hat-shaped cross section with edge lines, and includes a lip portion coupled to the lower casing 21a. The second center member 70C is coupled with the center of the second rear cross member 80. Further, brackets 90 on which the bars 91 (see FIG. 1) are mounted are respectively secured on both sides of the region of the second rear cross member 80 where the second center member 70C is coupled, for coupling the second rear cross member 80 with the rear cross member 19. The bar 91 is secured to the bracket 90 with bolts 92. As illustrated in FIG. 1, the top ends of the bars 91 are coupled with the rear cross member 19 using bolts 93.

As illustrated in FIG. 3, the second front cross member 85 couples the left and right second side members 70L and 70R together at the lengthwise intermediate portion of the left and right second side members 70L and 70R. Similar to the second rear cross member 80, the second front cross member 85 also has a hat-shaped cross section with edge lines, and includes a lip portion coupled to the lower casing 21a.

As illustrated in FIG. 3, the second center member 70C is an elongated member to be mounted at the widthwise center of the lower casing 21a in the rear part of the lower casing 21a and extending in the length direction of the vehicle. The second center member 70C is disposed such that the front end thereof is connected with the first center member 40. The second center member 70C includes arms 78a and 78b extending outward to respective sides in the vehicle width direction.

As illustrated in FIG. 5, the second center member 70C has a hat-shaped cross section with edge lines 76 and 77. The second center member 70C includes a center portion extending in the vehicle length direction and having a height that is greater than the heights of the arms 78a and 78b, and the edge lines 76 and 77 extend continuously in the length direction beyond a region of the second center member 70C where the arms 78a and 78b are provided. The second center member 70C includes a lip portion 79 mounted on the lower casing 21a through spot welding at locations indicated by X in the figure.

The width of second center member 70C is substantially the same as the width of the first center member 40, and the edge lines 48 and 49 of the first center member 40 are respectively connected with the edge lines 76 and 77 of the second center member 70C. The rear part of the second center member 70C runs across and is coupled with the second front cross member 85 and the second rear cross member 80. Here, the configuration of the coupling portion is similar to that of the coupling portion of the first center member 40 and the first cross member 306 which is described above with reference to FIG. 5.

The second intermediate members 70D and 70E extend in the length direction of the vehicle between the left and right second side members 70L and 70R to couple the first cross member 306 and the second rear cross member 80 together. Each of the second intermediate members 70D and 70E, similar to the second center member 70C, includes arms 78c and 78d extending to respective sides. The configurations of the second intermediate members 70D and 70E are similar to that of the second center member 70C except that their front ends extend to the first cross member 306.

The inward arms 71b of the second side members 70L and 70R extending inward along the vehicle width, the arms 78c and 78d of the second intermediate members 70D and 70E, and the arms 78a and 78b of the second center member 70C have substantially the same cross sections, and the ends of these arms are coupled along the vehicle width to form structural members extending along the vehicle width.

The second side members 70L and 70R, and the second center member 70C together form second lengthwise members. The first side members 60L and 60R and the first center member 40 forming the first lengthwise members described above, and the second side members 70L and 70R and the second center member 70C forming the second lengthwise members form lengthwise members.

As described above, the second region in the rear part of the battery frame 100 includes the second side members 70L and 70R, the second center member 70C, and the second intermediate members 70D and 70E, which extend in the length direction of the vehicle, and the second rear cross member 80 and the second front cross member 85, which extend in the vehicle width direction, to form a planar frame structure having a lattice shape. The outer arms 71a protruding laterally outward in the front part of the planar frame structure are coupled to the lower side members 13, and the center portion of the second rear cross member 80 at the rear end of the planar frame structure is coupled with the rear cross member 19, to thereby form a structure that supports the rearward bottom of the battery pack 20 in three-point mounting.

As described above, the battery frame 100 is configured such that the edge lines 61 and 62 of the first side members 60L and 60R that are lengthwise members of the first region in the front part of the vehicle and the edge lines 72 to 75 of the second side members 70L and 70R that are lengthwise members in the second region in the rear part of the vehicle are connected along the vehicle length. Further, the first side members 60L and 60R are coupled with the first cross members 302 to 306 in the first region, and the second side members 70L and 70R are coupled with the second rear cross member 80 disposed at the rear end of the second region. Also, the edge lines 48 and 49 of the first center member 40 that is a lengthwise member in the first region in the front part of the vehicle and the edge lines 76 and 77 of the second center member 70C that is a lengthwise member in the second region in the rear part of the vehicle are connected along the length of the vehicle. The first center member 40 is coupled with the first cross members 301 to 306 in the first region, and the second center member 70C is coupled with the second rear cross member 80.

As the edge lines of the plurality of lengthwise members are connected in the length direction of the vehicle, the strength of the battery frame 100 along the length is enhanced. This configuration reduces deformation of the battery frame 100 when a lengthwise load is input, and also reduces deformation of the battery pack 20 supported by the battery frame 100.

The first region in the front part of the battery frame 100 has a multipoint supporting structure in which a plurality of first cross members 301 to 306 support the bottom of the battery pack 20, which is different from the structure of the second region in which the opposite ends in the front part and the rear end are coupled with the vehicle lower structure 200 to thereby support the bottom of the battery pack 20 in three-point mounting. As such, the first region and the second region have different support structures and therefore the lengthwise members are disposed separately for each region. However, as the battery frame 100 is configured such that the edge lines of the lengthwise members in the first region and the edge lines of the lengthwise members in the second region are connected, the strength against the lengthwise load can be enhanced, thus reducing deformation of the battery frame 100 and also deformation of the battery pack 20 supported by the battery frame 100.

In the above example, the edge lines 61 and 62 of the first side members 60L and 60R and the edge lines 72 to 75 of the second side member 70L and 70R are connected along the length of the vehicle, and the edge lines 48 and 49 of the first center member 40 and the edge lines 76 and 77 of the second center member 70C are connected along the length of the vehicle. However, the present disclosure is not limited to this configuration, and there may be employed any configuration in which the edge lines of at least one of the first side members 60L and 60R and the first center member 40 that form the first lengthwise members, and the edge lines of at least one of the second side members 70L and 70R and the second center member 70C that form the second lengthwise members are connected along the length of the vehicle. For example, the battery frame may be configured such that the edge lines 48 and 49 of the first center member 40 and the edge lines 76 and 77 of the second center member 70C are connected along the length of the vehicle while the edge lines 61 and 62 of the first side members 60L and 60R and the edge lines 72 to 75 of the second side members 70L and 70R are not connected along the length of the vehicle. Alternatively, the battery frame may be configured such that the edge lines 61 and 62 of the first side members 60L and 60R and the edge lines 72 to 75 of the second side members 70L and 70R are connected along the length of the vehicle, while the edge lines 48 and 49 of the first center member 40 and the edge lines 76 and 77 of the second center member 70C are not connected along the length of the vehicle.

Further, while in the battery frame 100 in the above example, the heights of the first side members 60L and 60R and the first center member 40 are greater than the heights of the first cross members 301 to 306, and the edge lines 61, 62, 48, and 49 extend continuously past the intersection regions of these edge lines and the first cross members 301 to 306, the configuration of the battery frame is not limited to this example. For example, the battery frame 100 may be configured such that the heights of the first side members 60L and 60R, and the first center member 40 are the same as or smaller than the heights of the first cross members 301 to 306, such that the bottom plate 65 of the first side members 60L and 60R and the bottom plate 45 of the first center member 40 are superposed on and coupled with the top surface of the center portion 31 and the edge lines 61, 62, 48, and 49 extend continuously across the intersection regions.

Also, while in the above example, the heights of the lengthwise center portions of the second side members 70L and 70R and the second center member 70C are greater than the heights of the arms 71a, 71b, 78a, and 78b, and the edge lines extend continuously in the vehicle length direction, the height of the lengthwise center portion may be the same as the height of each of the arms 71a, 71b, 78a, and 78b. In this configuration, an additional member or a bead, for example, may be provided to connect the front edge lines and the rear edge lines with sufficient strength.

The invention claimed is:

1. A battery frame coupled with a pair of side members disposed at widthwise opposite sides of a vehicle and extending in a length direction of the vehicle and with a rear cross member coupling the pair of side members along a width of the vehicle in a rear part of the vehicle, the battery frame being configured to support, from underneath, a bottom of a battery pack mounted under a floor panel disposed between the side members, the battery frame comprising:
a plurality of first cross members extending in a width direction of the vehicle and coupled to the side members at opposite ends, respectively, to support the bottom of the battery pack;
a second cross member coupled with the rear cross member and extending in the width direction of the vehicle to support a rear end of the bottom of the battery pack; and
lengthwise members extending in the length direction of the vehicle and coupled with each of the first cross members and the second cross member, wherein the lengthwise members are elongated members each having a hat-shaped cross section, the lengthwise members being disposed such that edge lines thereof extend continuously in the length direction of the vehicle.

2. The battery frame according to claim 1, comprising:
a first region that supports a front part of the battery pack and a second region that supports a rear part of the battery pack, wherein the lengthwise members comprise a plurality of first lengthwise members disposed in the first region and a plurality of second lengthwise members disposed in the second region, and at least one of the first lengthwise members and at least one of the second lengthwise members are disposed such that the edge lines are connected along the length of the vehicle.

3. The battery frame according to claim 2, wherein the first lengthwise members comprise a pair of first side members disposed at widthwise opposite sides of the vehicle and a first center member disposed in a widthwise center, the second lengthwise members comprise a pair of second side members disposed at widthwise opposite sides of the vehicle and a second center member disposed in a widthwise center, and each of the first side members and each of the second side members are disposed such that the edge lines are connected along the length of the vehicle, and the first center member and the second center member are disposed such that the edge lines are connected along the length of the vehicle.

4. The battery frame according to claim 3, wherein the second cross member couples rear ends of the second side members, and a rear end of the second center member is coupled to a center of the second cross member.

* * * * *